July 12, 1966  T. R. DAVEY ET AL  3,260,592
COPPER DROSSING OF LEAD BULLION
Filed Jan. 9, 1963  2 Sheets-Sheet 1
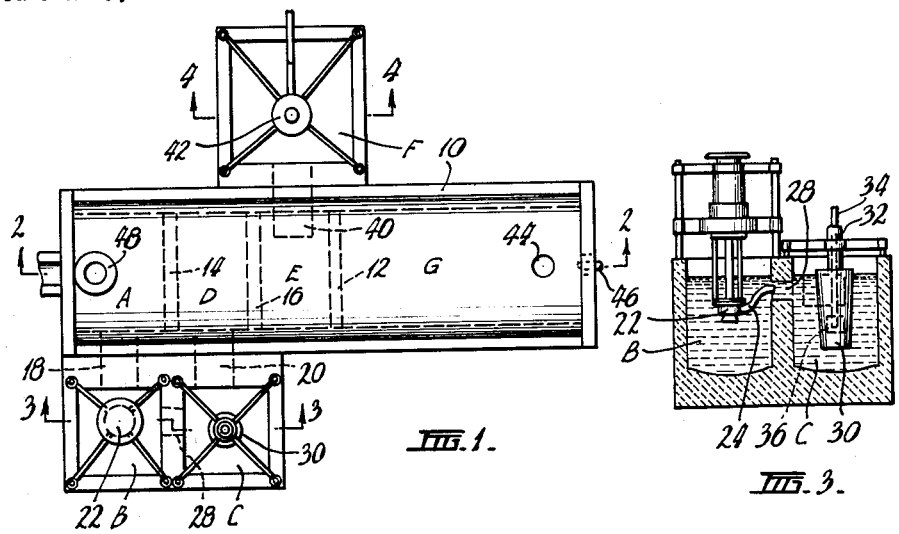
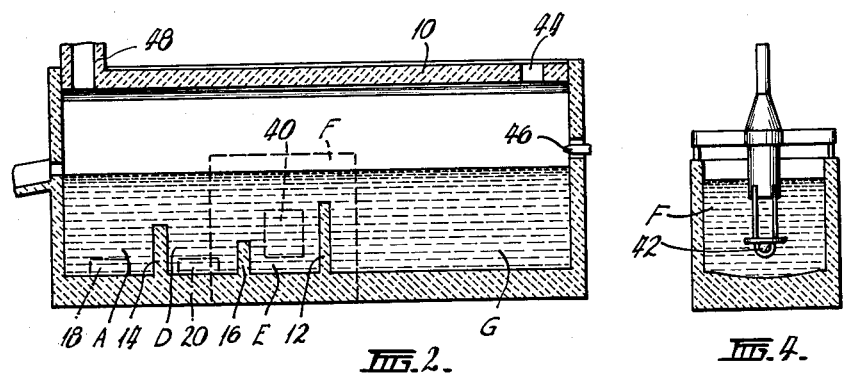
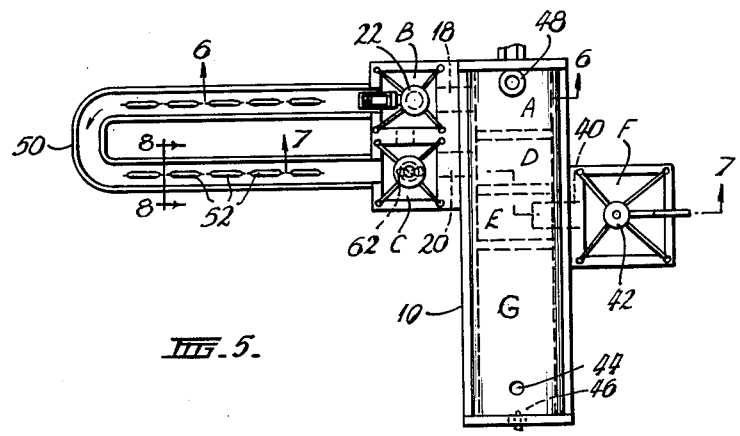

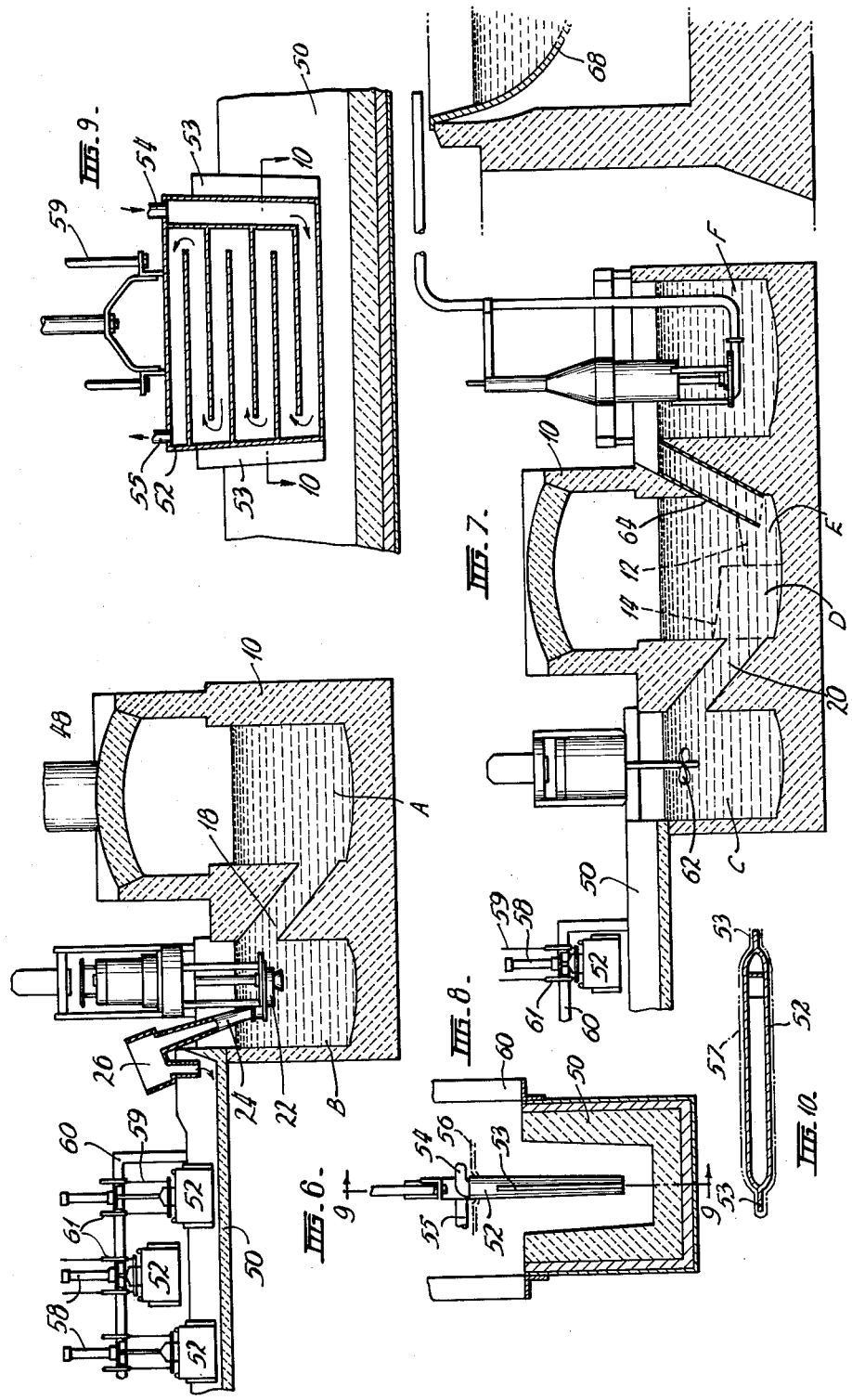

United States Patent Office 3,260,592
Patented July 12, 1966

3,260,592
COPPER DROSSING OF LEAD BULLION
Thomas Ronald Davey, Bristol, England, and Herbert T. Webster, Port Pirie, South Australia, Australia, assignors to The Broken Hill Associated Smelters Proprietary Limited, Melbourne, Victoria, Australia, a corporation of Australia
Filed Jan. 9, 1963, Ser. No. 250,397
7 Claims. (Cl. 75—78)

Lead bullion as produced, for example, in a blast furnace, generally contains small proportions of various other metals, the composition of the bulion being, of course, dependent on the ore being treated. In order to produce lead of market grade, it is necessary to subject the bullion to a series of refining operations to remove the bulk of those other metals which commonly include copper, arsenic, antimony and silver, and the present invention is concerned primarily with the operation of removing copper.

This operation, which is termed copper drossing, is generally carried out by slowly cooling a batch of molten bullion in a large open pan. The solubility of copper in lead decreases as the temperature falls, so that a copper-rich dross separates out and floats to the surface where it forms a crust which is periodically removed by skimming.

The presence of sulphur reduces the solubility of copper in lead and thus the amount of copper remaining in the bullion, after the initial treatment, is sometimes reduced by a sulphur treatment.

The said batch copper drossing operation involves heavy manual labour under conditions which are unpleasant and unhygienic, due both to the heat and to the evolution of fumes from the molten metal. In addition, considerable quantities of fuel are used.

For these and other reasons, attempts have been made to carry out the copper drossing operation continuously but these attempts appear to have met with only limited success. Thus, it has been found that if the temperature of the hot bullion is lowered by passing it in contact with cool surfaces, accretions of solid metal progressively form thereon and these accretions not only reduce the heat transfer efficiency but also reduce the effective volumetric capacity of the chamber in which the operation is carried out.

The present invention provides a method of separating copper from lead bullion, comprising continuously mixing bullion at a relatively high temperature with recirculated bullion having a lower temperature and a lower copper content whereby the mixture has an intermediate temperature so that copper dross separates therefrom, cooling the said mixture, recirculating a proportion of the cooled mixture for admixture with additional hot bullion and discharging the balance of the cooled mixture from the operation.

More particularly, the hot bullion preferably flows downwardly from the upper zone of a bath thereof and it preferably continues to flow downwardly after admixture with the cooler bullion, while the dross particles which separate from the mixture tend to rise to and float on the free surface. Preferably, the surface of the bath is maintained at a temperature above the melting point of the dross, whereby the latter may flow through a suitably positioned discharge opening thereby eliminating the aforesaid manual skimming operation.

Thus the hot bullion is cooled principally by admixture with the recirculated cooler bullion, so that the dross separates out within the body of the mixture. Consequently, the formation of the solid accretions on the walls of the containing furnace or the like is substantially avoided.

The temperature of the incoming bullion, before admixture with the recirculated bullion, is advantageously of the order of 1100° C., while the temperature of the said mixture before cooling may conveniently be about 400° C. and the temperature drop produced by the cooling step may be about 30° C.

The operation of cooling the said mixture may be effected in any suitable way. Thus, for example, a known type of rotary cooler may be arranged within a chamber through which the molten metal is pumped at a suitable velocity. The rotary cooler is preferably arranged for convenient removal and replacement by an interchangeable cooler in order that any accretions which form on its surface may be removed without suspending the refining operation.

Alternatively, and preferably, the molten mixture may be cooled by causing it to flow through a channel provided at different positions along the length thereof with a plurality of removable immersion coolers as hereinafter further described.

The aforesaid bath in which the hot and cooler streams of bullion are admixed is preferably of considerable depth in order to provide a sufficiently high measure of thermal inertia as hereinafter further explained, whereby, among other things, the continuity of the operation does not necessitate the continuous supply of hot bullion to the bath thereof.

If desired, and as hereinafter described, the operation may be conducted so as to effect removal of arsenic as well as copper and one important advantage of so doing is to avoid the necessity for subjecting the bullion to a softening operation before it is desilverised. Thus, while arsenic, if present, interferes with the desilverising operation, antimony which is also removed by the softening operation does not do so, and so may remain in the bullion until a later stage.

The invention further includes apparatus for use in carrying out the said method, comprising a furnace adapted to hold a deep bath of molten bullion, a plurality of submerged partitions or baffles subdividing the lower part of the furnace into a plurality of compartments comprising a reservoir compartment, a mixing compartment, and an inflow compartment for cooled bullion, and including means for withdrawing bullion from the mixing compartment, means for cooling the thus withdrawn bullion, means for returning cooled bullion to the inflow compartment, and means for continuously discharging a proportion of the cooled bullion.

More particularly, the said mixing and inflow compartments are preferably arranged side-by-side and means are preferably provided for heating the surface of the bath of molten metal in the furnace.

The invention is hereinafter more fully described with reference to the accompanying drawings in which:

FIGURE 1 is a view in plan of continuous copper drossing apparatus according to the invention.

FIGURE 2 is a view in longitudinal section on the line 2—2 of FIGURE 1,

FIGURE 3 is a view in sectional elevation taken on the line 3—3 of FIGURE 1,

FIGURE 4 is a view in sectional end elevation taken on the line 4—4 of FIGURE 1, FIGURE 5 is a view in plan of continuous copper drossing apparatus including alternative means for cooling the bullion, FIGURES 6 and 7 are views in sectional end elevation taken respectively on the line 6—6 and 7—7 of FIGURE 5, FIGURE 8 is a view in sectional end elevation taken on the line 8—8 of FIGURE 5, FIGURE 9 is a view in elevation of an immersion cooler taken on the line 9—9 of FIGURE 8, and FIGURE 10 is a view in sectional plan taken on the line 10—10 of FIGURE 9.

The continuous copper drossing furnace 10 shown in FIGURES 1 to 4 inclusive is of rectangular shape in plan and for the purpose of description, may be assumed to be about fifteen feet long, five feet wide and eight feet high and which, when in use, contains a bath of molten bullion of the order of four and a half feet in depth.

The interior of the furnace is sub-divided below the free surface of the bullion by three transversely extending partition walls 12, 14 and 16 of different heights, the wall 12 being arranged about midway between the ends of the furnace and being, for example, about three feet in height, so that its upper edge is disposed about one to one and a half feet below the surface of the molten metal.

The wall 14, which is disposed about two and a half feet from one of the end walls, is about two feet high, while the third partition wall 16 is rather more than twelve inches high and is arranged between the walls 12 and 14. Thus the bottom of the furnace is sub-divided into four transversely extending compartments by submerged partition walls of different heights, these compartments being designated A, D, E and G.

One end of compartment A communicates by an opening 18 formed in the respective side wall of the furnace, and close to the bottom thereof, with a recirculating pump chamber B which conveniently has its inner side formed by the furnace wall. A second external chamber C, which is separated from the chamber B by a common partition wall, communicates with the bottom of the adjacent end of the furnace compartment D by an opening 20 in the furnace wall.

A circulating pump 22 is arranged in the pump chamber B and the molten metal discharged by the pump passes into the chamber C through an opening 28 in the common partition wall below, but near the surface of, the molten metal therein.

The chamber C is a cooling chamber and for this purpose, a vertical rotary drum cooler 30 is immersed in the molten metal therein. This cooler comprises a hollow cylindrical or downwardly tapered steel drum secured to the lower end of a vertical hollow spindle 32 which is suitably supported above the furnace and arranged to be driven in any convenient manner. A fixed inlet pipe 34 for cooling water extends axially through the hollow spindle into the interior of the drum, while the water is discharged from the drum through the annular passage between this pipe and the inner periphery of the spindle. A vertical draught tube 36 is preferably arranged within the drum, and about the lower end of the water inlet pipe, to control the thermo-syphonic circulation of the water within the drum.

This rotary drum cooler is a high intensity cooling device, as high heat transfer rates can be achieved with this apparatus by maintaining high velocities of both the molten lead and water in contact with the outer and inner faces respectively of the peripheral wall thereof.

A further external chamber F arranged at the opposite side of the furnace communicates, by an opening 40 in the furnace wall, with the bottom of the adjacent end of the narrow centrally located furnace compartment E. This chamber F contains a submerged discharge pump 42 for the treated bullion and is similar in construction to chamber E.

Suitable provision is made for supplying the hot bullion to the outer end portion of the compartment G from the blast furnace, and for this purpose, the top or crown of the furnace may conveniently be provided with a charge port 44. The temperature of the bullion is usually about 900° C. and as temperatures of this order are too high for available pumps, it may be necessary to deliver the bullion intermittently by means of ladles. Due, however, to the large volumetric capacity and thermal inertia of the furnace, such intermittent supply of bullion does not preclude continuity of the copper drossing operation hereinafter described. Thus the furnace compartment F serves as a reservoir compartment for the hot bullion.

A burner 46 is arranged at the charging end of the furnace, while a discharge flue 48 is arranged at the opposite end thereof so that the hot gases sweep over the molten metal and so maintain the surface thereof at a temperature of about, say, 1100° C., whereby the layer of dross which accumulates thereon, as later described, is maintained in the molten condition.

In operation, the discharge pump 42 in the chamber F is operated to discharge molten lead from the furnace compartment E at the average rate (say, 25 tons per hour) at which it is supplied to the furnace through the charging port 44 while the circulating pump 22 in the chamber B is operated so as to withdraw the molten metal at a much higher rate—say, at 600 tons per hour —from furnace compartment A and deliver it to the cooling chamber C from which it gravitates into the bottom of the adjacent end of the transverse furnace compartment D which thus serves as an inflow compartment for the cooled bullion.

This lead, which enters this compartment D at a temperature of, say, 380° C., flows upwardly therein at the rate of 600 tons per hour and then divides into two streams which pass over the adjacent submerged partition walls 14 and 16 into the compartments A and E respectively on opposite sides thereof. The quantity which thus passes into compartment E is determined by the discharge rate of the pump 42 in the discharge chamber F, i.e. 25 tons per hour.

The balance of the lead supplied to the compartment D thus passes into the compartment A at the rate of 575 tons per hour, where it mixes with the hot bullion which flows downwardly therein from the surface at the rate of 25 tons per hour. This incoming bullion in the example under consideration is maintained at a temperature of about 1100° C., so that the mixture has a temperature of about 410° C. Thus lead at a temperature of 410° C. enters the cooling chamber C at the rate of 600 tons per hour and leaves that chamber at a temperature of 380° C.

The hot bullion supplied, as above explained, to the right-hand compartment G, flows at the rate of 25 tons per hour above the compartments E and D to the left-hand or mixing compartment A where it flows downwardly to mix with the cooler recirculated bullion as already explained.

Consequently, the hot incoming bullion is cooled in or above compartment A by admixture with the recirculated bullion and the zone in which this admixture takes place is disposed largely out of contact with the furnace walls. Dross particles thus separate throughout the mass of the mixture and tend to float upwardly to the free surface of the bath, it being clear that in order to collect the dross on the surface, the rate of downward flow in the compartment A must not exceed the rate at which the dross particles float upwardly therein.

The bullion of intermediate temperature discharged from the bottom of compartment A is thus comparatively free from dross, while a further separation occurs when the cooled bullion enters compartment D from the cooler. Thus the lead which enters the compartment E for discharge from the furnace is substantially dross-free.

When the drum cooler 30 is operating correctly, the outer surface thereof has a temperature higher than the melting point of lead, so that solid lead is not deposited thereon, but accretions of higher melting point constituents, e.g. sulphides, arsenide and antimonides, could be expected to form thereon. Thus it would be necessary at intervals to remove the cooler and to replace it by another, to enable such accretions to be removed. This operation may be effected by a machining operation or, in the case of a downwardly tapered drum, by forcing the collar of solid deposits therefrom by means of a hydraulic ram.

FIGURES 5 to 10 inclusive show the substitution of alternative and preferred means for cooling the circulating bullion, though such alternative cooling means per se do not form a part of this invention. The continuous copper drossing furnace and the associated external chambers shown in FIGURES 5, 6 and 7 are substantially the same as that shown in the preceding figure, and the corresponding parts thereof are designated by the same references. However, the chamber C in this case merely forms a well for the return of the cooled bullion to the interior of the furnace so that it does not contain a cooling device such as the rotary cooler 30 previously described, nor does this chamber C communicate directly with the adjacent chamber B.

An external elongated open launder 50 of U shape in plan is disposed above the level of the bullion in the furnace and one of its ends is closed and arranged adjacent to the chamber B in order that the bullion withdrawn from the furnace compartment A by the circulating pump 22 may be conveniently discharged directly into the launder through the delivery pipe 24, the interior of which is accessible through an open pot 26 as shown in FIGURE 6. The opposite end of the launder is open and is arranged to discharge the cooled bullion directly into the top of chamber C as shown in FIGURE 7.

The launder slopes downwards at a small angle from its inlet to its discharge end and is of deep and narrow shape in cross-section as shown in FIGURE 8. For example, the channel in the launder may be about thirteen inches deep to contain molten lead to a depth of about seven to ten inches without risk of spillage, while the width may decrease downwardly from the top where it may be, say, seven to ten inches wide.

The launder normally accommodates a plurality of hollow immersion coolers 52 arranged in series along the length thereof and centrally between the sides thereof.

The coolers 52 are conveniently of vertical plate-like form as shown, and may, for example, be about 24 inches in length, 16 inches in height, and 2 inches in thickness, and are arranged with their lower ends disposed close to, but above, the bottom of the launder channel. The top of each cooler is fitted with inlet and outlet pipes 54 and 55 respectively for cooling water and the interior thereof is provided with suitable baffles to cause the water to pass therethrough in a predetermined path. The side and end faces of the cooler preferably taper downwardly to some extent as shown thereby to facilitate the separation of the solid accretions therefrom.

Each cooler is suspended from a corresponding vertical pneumatic ram 58 mounted on a frame structure 60 in order that the cooler may be withdrawn from, and replaced in, the launder while angular movements of the cooler are prevented by spaced vertical guide rods 59 which extend upwardly therefrom and slidably through fixed sleeves 61 on the said frame structure.

As the molten metal flows past the immersed coolers 52 a layer 57 of metal, which progressively increases in thickness, forms on each of them. These solid accretions, which extend around the sides and ends of the coolers in the form of an envelope, reduce the rate of heat transfer and also reduce the effective cross-sectional area of the channel, thus producing a rise in the level of the molten metal therein. It is necessary, therefore, to remove these accretions at suitable intervals and this may be accomplished by cutting off the flow of cooling water to each cooler in turn so that the solid accretions thereon are remelted.

Preferably, however, each cooler is lifted out of the launder in turn by operating the respective pneumatic ram 58. See FIGURE 6, which shows one of the coolers in the raised position. The flow of cooling water through the coolers continues when the latter are raised and the resulting thermal contraction, in conjunction with the downwardly tapered form of the coolers, tends to cause the accretions to drop back into the channel in which they are wholly or partly remelted.

The coolers shown in the drawings are extended at both ends by solid vertical wings 53. These wings do not cool as quickly as the water cooled bodies 52 when the latter are withdrawn so that zones of weakness are produced in the enveloping layer 57 of metal accretions near the junctions between the wings and the water cooled bodies and this facilitates the desired separation of the accretions.

Preferably, the coolers are automatically raised and lowered in turn under the control of suitable timing mechanism not forming a part of the present invention.

In order positively to separate the accretions 57 when the coolers 52 are withdrawn from the launder, each cooler may extend slidably through a corresponding fixed stripper plate shown in broken lines at 67 in FIGURE 8.

In lieu of returning the solid accretions to the launder, it may be preferred to return them to the hot zone of the furnace and, for this purpose, each cooler, after being withdrawn vertically from the launder, may be moved laterally out of alignment therewith before the accretions are stripped therefrom.

Irrespective of the manner in which the accretions are removed, this operation is preferably carried out successively with different coolers so that the total cooling effect is not greatly reduced at any one time.

The rate at which heat is removed from the molten metal may thus be regulated by varying the number of cooling plates immersed in the molten metal and/or by varying the time between the successive operations of removing the accretions therefrom. Thus the method and apparatus permits of effective regulation of the temperature of the metal discharged from the channel.

Referring now to FIGURE 7, a propeller type agitator or stirrer 62 is immersed in the chamber C to prevent choking of the upper part thereof by unmelted portions of the solid metal removed from the coolers 52 while an inclined updraught tube 64 is provided to discharge the molten metal from the bottom of the furnace compartment E to the chamber F from which it is delivered by pump 66 into the holding kettle 68.

An important feature of the herein described method of copper drossing is that the heat of the bullion supplied to the furnace is used to smelt the dross so that a considerable saving of fuel is effected.

It is now well known that in order to facilitate the operation of skimming off the dross in the usual batch copper drossing operation, it is necessary to maintain a fine balance of sulphur to copper in the blast furnace bullion, but the present method which eliminates the skimming operation by providing a surface layer of dross in the liquid condition, obviates this requirement so that a lower sulphur to copper ratio could be used.

Experiments have shown that when this ratio is sufficiently reduced, arsenic tends to be removed with the copper dross, and thus the invention also includes the step of adding copper to the furnace in order to reduce the arsenic content of the bullion to a sufficiently low value.

If this is done, the operation of desilverising the bullion may be carried out before the softening operation which would greatly facilitate the refining procedure.

Thus the invention further includes a sequence of refining operations wherein copper and arsenic are removed substantially as above described, after which the bullion is desilverised (preferably by a continuous operation) before it is subjected to a softening treatment.

We claim:
1. Continuous process of separating copper from a molten lead bullion containing copper.
    which comprises
    continuously mixing molten copper-containing lead bullion, at an initial temperature substantially above 400° C. and contained as a body in a container having walls, with recirculated molten substantially de-copperized lead bullion at a temperature lower than about 400° C.;

said mixing being effected within said body and out of substantial contact with such container walls and in suitable proportions, such that the mixture has a temperature, of the order of 400° C., intermediate the temperature of the copper-containing lead bullion and of the recirculated substantially de-copperized lead bullion whereby due to decreased solubility at such intermediate temperature copper dross separates from the mixture and rises to the surface of the bullion to form a molten layer thereon;

discharging copper dross from said layer thereof;

cooling the aforesaid mixture after separation of the copper dross therefrom;

recirculating a major part of the resulting cooler molten substantially de-copperized lead bullion for admixture with further amounts of molten copper-containing lead bullion in said mixing zone; and discharging from the system the remainder of said resulting cooler molten substantially de-copperized lead bullion.

2. The continuous process defined in claim 1 wherein said mixing is effected in a sub-surface zone of said body and between hot copper-containing lead bullion initially at a temperature materially in excess of 400° C. and said cooler molten substantially de-copperized lead bullion.

3. The method according to claim 1 wherein the fresh bullion entering the mixing zone has a temperature of the order of 1100° C.

4. The method of continuously separating copper from copper-containing lead bullion comprising maintaining bullion at a high temperature within a bath thereof; continuously withdrawing bullion, at an intermediate temperature of the order of 400° C., downwardly from a sub-surface mixing zone maintained within the bath;

cooling the bullion thus removed from the bath;

recirculating to the mixing zone such a proportion of said cooled bullion that admixture thereof with copper-containing bullion at said high temperature will maintain said intermediate temperature in the mixing zone; and discharging the balance of the cooled bullion from the system, whereby bullion at said high temperature flows downwardly into said mixing zone at the same rate as cooled bullion is discharged from the system, and whereby copper dross separates from said mixture of intermediate temperature and floats to the surface of the bath and forms a layer thereon.

5. The method according to claim 4 wherein all of the cooled bullion is returned to a lower part of the said bath adjacent to said mixing zone therein and wherein said balance of the cooled bullion is withdrawn from a lower portion of said bath.

6. The method according to claim 4 wherein the hot bullion entering the mixing zone has a temperature of the order of 1100° C., the temperature of the mixture withdrawn from the mixing zone is of the order of 400° C., and the fall in temperature produced by said cooling step is of the order of 30° C.

7. The method of continuously separating copper from copper-containing lead bullion, comprising maintaining bullion at a high temperature within the upper part of a bath thereof;

continuously withdrawing substantially de-copperized lead bullion of intermediate temperature downwardly from a sub-surface mixing zone maintained within the bath;

cooling the bullion thus withdrawn;

returning the resulting cooled molten bullion to the bottom of the bath adjacent to but not vertically below the said mixing zone;

continuously withdrawing a proportion of said returned cooled bullion from the lower portion of the bath; and directing the remaining proportion of said cooled bullion upwardly and laterally into said mixing zone whereby it mixes therein with said high temperature bullion to form a mixture having said intermediate temperature, and wherein copper dross, which separates from the mixture, floats to the surface and forms thereon a molten layer which is continuously or periodically discharged.

References Cited by the Examiner

UNITED STATES PATENTS

| | | | |
|---|---|---|---|
| Re. 18,930 | 8/1933 | Davis | 75—63 |
| 1,435,142 | 11/1922 | Angel | 62—122 X |
| 1,583,495 | 5/1927 | Schleicher | 266—34 |
| 1,687,187 | 10/1928 | Williams | 266—34 |
| 1,843,413 | 2/1932 | Betterton | 75—78 |
| 2,101,975 | 12/1937 | Betterton | 75—78 |
| 2,109,144 | 2/1938 | Betterton | 75—78 |
| 2,142,875 | 1/1938 | Schmeller | 266—34 |
| 2,648,715 | 8/1953 | Lillienberg | 266—34 |
| 2,756,043 | 7/1956 | Fleiszar | 266—24 |
| 2,761,672 | 9/1956 | Wilkins | 266—24 |

OTHER REFERENCES

Bray: Non Ferrous Production Metallurgy, 2d Ed., 1947, John Wiley & Sons, Inc., New York, pages 303–306.

DAVID L. RECK, *Primary Examiner.*

BENJAMIN HENKIN, *Examiner.*

H. W. CUMMINGS, H. W. TARRING,
*Assistant Examiners.*